(No Model.)
F. J. PATTEN.
SYNCHRONIZING SYSTEM FOR ELECTRIC MOTORS.
No. 392,967. Patented Nov. 13, 1888.
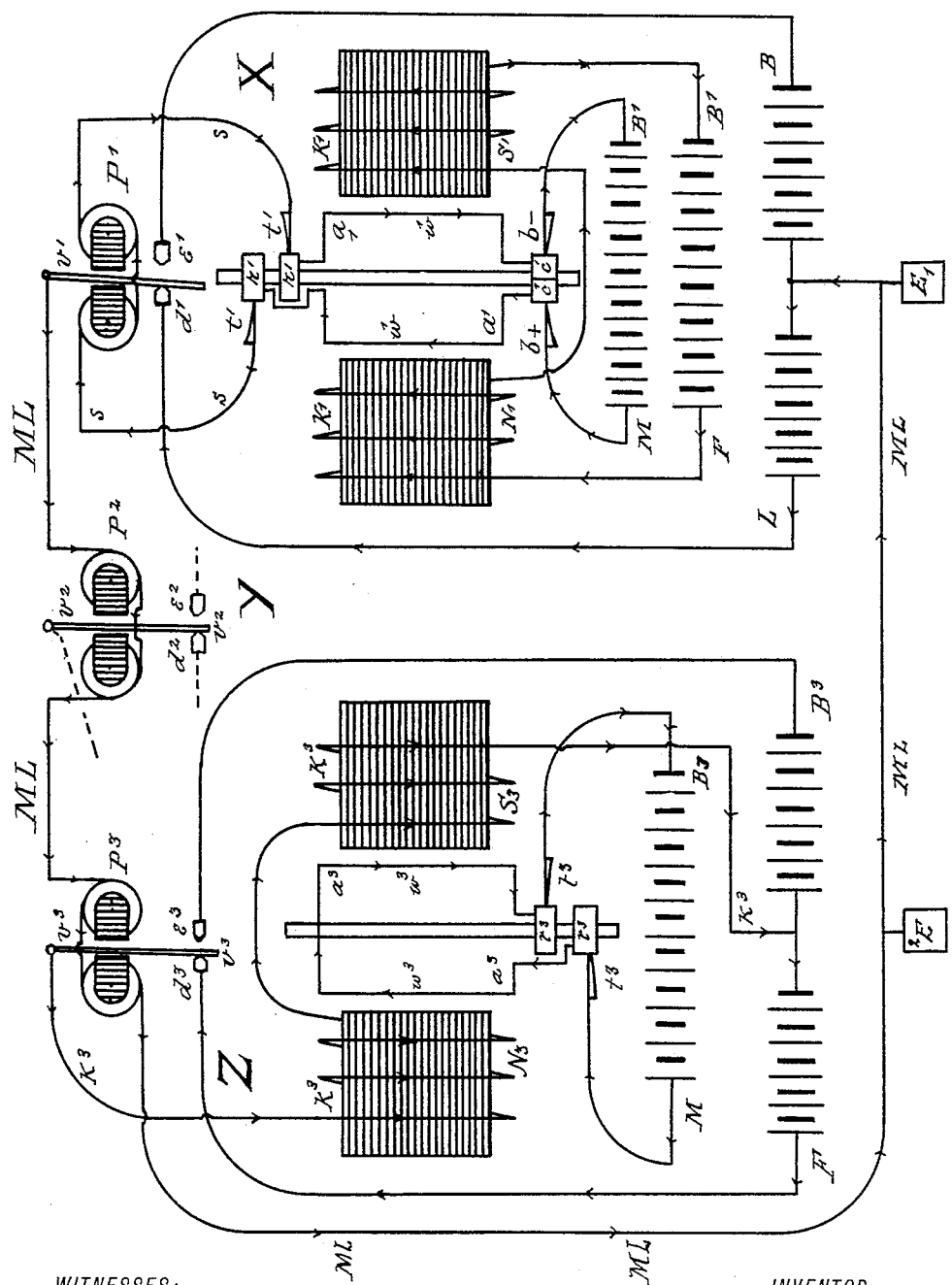
WITNESSES:
J. W. Love
J. M. Sumner
INVENTOR,
Francis Jarvis Patten

UNITED STATES PATENT OFFICE.

FRANCIS JARVIS PATTEN, OF BATH, MAINE, ASSIGNOR TO J. M. SEYMOUR, OF NEW YORK, N. Y.

SYNCHRONIZING SYSTEM FOR ELECTRIC MOTORS.

SPECIFICATION forming part of Letters Patent No. 392,967, dated November 13, 1888.

Application filed June 1, 1888. Serial No. 275,787. (No model.)

*To all whom it may concern:*

Be it known that I, FRANCIS JARVIS PATTEN, a citizen of the United States, residing at Bath, county of Sagadahoc, in the State of Maine, have invented a new and useful Synchronizing System for Electric Motors, of which the following is a specification.

The invention embodies a series of motors located at different stations, one of said motors being a controlling-motor and the other motors having their rate of speed controlled by said controlling-motor, each of the controlled motors having independent field-magnet and armature circuits one of which is excited by a constant source of current and the other of which is excited by an alternating current the impulses of which are controlled by a line connecting the several stations, said line including mechanism for producing the alternations dependent for its action on the operation of the controlling-motor.

It is the purpose of my invention to cause two or more electric motors of any size and power and located at different distant points to revolve in unison or at a common rate of speed for all; also to follow any change of speed to which a governing or controlling machine may be subject, and therefore produce uniform motion of all at either a constant or a variable speed. In the system here described the motors are all independent of each other, being each supplied by a separate local source of energy.

The figure shows by diagram the different motors, circuits, and connections in the system I have invented.

X Y Z are distant stations connected by the main-line circuit M L, which at station X is connected to the middle point of the split-line battery L B, whence it passes to all the distant stations where the other motors are to be controlled and returns to the armature of the polarized relay or vibrator at X. One of the motors—that shown in the figure at station X—is designated as the governing-motor and all the others are caused to revolve in unison with it, and this machine is organized differently from the others, all of which are alike, one of them being shown in detail at station Z, the station Y representing any other intermediate station. It is therefore sufficient to explain the system to show the governing-machine and one of the governed motors with connecting-circuits.

The governing-motor at X and its connection with the circuit will be first explained.

At station X is an ordinary direct-current electric motor of simple form. It has two field-magnets, N' S', the coils $k'$ $k'$ of which are energized by the independent source of energy F B'. This machine is provided with an ordinary shuttle-wound Siemens armature, $a'$ $a'$, the coils of which, $w'$ $w'$, are connected to an ordinary two-part reversing-commutator, $c'$, upon which the two brushes $b+$ and $b-$ bear constantly. These brushes are connected in the circuit of an independent source of energy M B', designated as the motor-battery, the function of which is to energize the armature and cause it to revolve. It is evident, however, that in the governing-machine at X both field and armature may be included in the same circuit.

The armature $a'$ $a'$ differs somewhat from an ordinary closed-coil armature, for, besides the ordinary direct current commutator, it has also two insulated ring-contacts, upon which the two rubbers $t'$ $t'$ bear, and the armature-coil is split in the middle and connected one terminal to each of the ring-contacts $r'$ $r'$. The armature-coil would thus be an open one and no current could flow through it. These rubbers $t'$ $t'$ are connected by a closed external circuit, $s$ $s$, which includes between its terminals $t'$ $t'$ the coils of the polarized relay P', provided with the ordinary vibrating armature, $v'$, and double contact-stops $d'$ $c'$. This external loop or single fixed coil of the revolving armature $a'$ $a'$ constitutes an essential feature of my system, and the device itself, which I style an "electromotor" device, rests upon this feature of an external fixed loop or coil, which is so connected as to form a part of the revolving-armature circuit, which thus remains permanently closed.

As the armature revolves under the influence of the direct current from the source of energy M B', the armature-circuit $a'$ $a'$ is traversed by rapidly-alternating currents through the reversing action of the commutator $c'$, which changes the direction of the current in the armature at each half-revolution thereof. The alternations of current in the armature $a'$ $a'$ and in the external fixed loop, $s's'$, are therefore in unison with the half-revolutions of the armature $a'$ $a'$ of the governing-motor at X. The polarized relay P' is therefore traversed by rapidly-alternating currents, and its armature $v'$ is kept in constant vibration by the revolving armature $a'$ $a'$ making contact alternately at $d'$ and $e'$, and each vibration must correspond to a half-revolution of the governing-motor. The fixed extremity of the armature $v'$ is connected to the main-line circuit M L and returns to the split-line battery L B, the poles of which are connected to the two stop-contacts $d'$ and $e'$. At each one of the several distant stations Y and Z the main-line circuit includes the coils of a polarized relay or other vibrator $P^2$ $P^3$, &c., similar to the one at station X. From the connection of the main-line circuit M L to the line-battery L B it results, therefore that alternating impulses of current will be sent over the main line at each vibration of the armature of the polarized relay at the station X, and these pulsations of current sent alternately through the stop-contacts $d'$ and $e'$ from the opposed halves of the split battery L B will maintain all the armatures $v^2 v^3$ of polarized relays in the main-line circuit in vibration, and they will all necessarily vibrate in unison with the armature $v'$ at X and the half-revolutions of the motor-armature at that station. All the armatures of the different polarized relays will therefore be at the half-revolutions of the governing direct-current electric motor at the initial station X.

At the stations Y Z, &c., are placed electric motors of a different type, one of which (shown at Z) will suffice for a description of all. This motor (designated as a driven or governed machine) has no direct-current commutator. Its armature is a single closed-coil circuit having no external loop. Its terminals are connected to two ordinary insulated rings, $r^3 r^3$, after the manner of an ordinary alternating-current armature, and against these rings two brushes, $t^3 t^3$, are held in contact, which are connected to the poles of a battery, M $B^3$, or other source of continuous direct current. The armature of the governed motor therefore receives constantly a current of one direction and has no reversing-commutator. The field-coils of this machine, $k^3 k^3$, which energize the field-magnets, are included in an alternating-current circuit, as follows: One terminal of the field-coils is connected to the middle of the split battery F $B^3$, whence it coils around the field-cores $N^3$ and $S^3$, and has its other terminal connected to the fixed extremity of the armature $v^3$ of the polarized relay at Z, the two contact-points $d^3$ and $e^3$ of which are connected to the opposite terminals of the split field-battery F $B^3$. From this system of local connections it results that at each vibration of the armature $v^3$ of the polarized rely $B^3$ at Z, the field-coils of the motor at that station will have their polarity reversed, and as the armature-circuit $a^3 a^3$ is traversed by a constant current of one direction it must of necessity make exactly one-half a revolution at each reversal of polarity of the field-magnets; but these reversals follow the alternating contacts of the armature $v^3$ as it vibrates back and forth, and, touching alternately at $d^3$ and $e^3$, reverse the current in the field-coils of the motor at Z. But inasmuch as the vibrating armature $v^3$ moves in perfect unison with the vibrating armature $v'$ at station X it follows that, since the latter moves once in response to each half-revolution of the motor at X, the motor at the distant station Z, revolving in unison with the vibrator at that point, must move in perfect unison with the governing-motor at the station X. The half-revolutions of all the governed machines are therefore controlled by the successive half-revolutions of the governing-motor, whether they be slow or fast and regular or irregular. All the machines will therefore revolve in unison at either a constant or variable rate of speed of one of them.

It is evident the main-line circuit M L may be either a complete metallic circuit, as shown, or it may be put to earth at $E'$ and $E^2$, and the polarized relays P' and $P^3$, &c., may be replaced by any form of vibrator, and the different sources of energy may be either dynamos or batteries, as shown.

Having thus described my invention, what I claim, and desire to secure by Letters Patent, is the following:

1. A synchronizing system for electric motors comprising a series of motors at different stations, one of said motors being a controlling-motor, the others being controlled motors, the controlled motors having independent field-magnet and armature circuits, a line-circuit connecting the several stations, a current-reverser operated by the controlling-motor for reversing current in one of the independent circuits of each of the controlled motors, and a source of direct current for exciting the other independent circuit of the controlled motor, for the purpose set forth.

2. A synchronizing system for electric motors comprising a series of motors at different stations, one of said motors controlling the others through a main-line circuit connecting the different stations, independent field-circuits and armature-circuits in the controlled motors, a source of direct current in one of said independent circuits, an independent source of current for the connecting line-circuit, and a pole-changer in said line-circuit at the controlling-station, said pole-changer being actuated by the controlling-motor at said station.

3. The organization of motors, circuits, connections, and sources of electric energy described, comprising a governing electric motor at one point and a series of governed electric motors at different distant points, an independent electric circuit connecting all said points, the coils of a polarized relay or vibrator being included in said circuit at each of said distant points, said circuit being connected through the armature and contact stops of an independent vibrator not in said circuit to a source of alternating current, said independent vibrator having its coils included in the armature-circuit of said governing-motor operated by an independent source of energy, the governing-motor operating said independent vibrator being a direct-current motor with an armature provided with an ordinary direct-current-reversing commutator, the armature-coils having the terminals connected to the commutator-segments, and also between said terminal extremities to a pair of insulated ring-contacts, and through the latter and brushes bearing thereon to an external stationary fixed loop or coil of said armature-circuit, said external armature-loop having included between its connecting extremities the coils of said independent controlling-vibrator, both the fields and armature of the said governing electric motor being in circuits that are independent of the line-circuit connecting the distant points.

4. The organization of motors, circuits, connections, and sources of electric energy described, comprising a main-line circuit connecting any number of distant points with its terminals connected, one to the vibrating armature of a polarized relay or vibrator actuated by a governing direct-current electric motor, the coils of said vibrator being included between the terminals of a single fixed external loop of the armature-circuit of said motor, and the other terminal of said main-line circuit connected to the middle point of a split battery the two terminal poles of which are connected alternately to the main-line circuit through the two stop-contacts of said vibrator and its vibrating armature.

5. The organization of motors, circuits, and connected sources of electric energy described, comprising a series of vibrators included in a main-line circuit, said circuit connecting in a single series any number of distant points, electric motors at such points having the terminals of their armature-coils connected through insulated continuous ring-contacts and brushes bearing thereon to the terminal poles of a battery or similar source of direct-current electric energy, supplying said armature-coils with a continuous current of one direction, the field-coils of said motors having one terminal connected to the middle point of a split battery and the other to the armature of the vibrator at said station, through which and the two stop-contacts the field-circuits are closed alternately through opposite poles of the split battery, the plus and minus terminals of which are connected to the two contact-stops of the vibrator.

6. The organization of motors and circuits described for producing the uniform rotation of the armatures of all, comprising a direct-current electric motor the armature of which is provided with a fixed external loop which includes the coils of a polarized vibrator, a series of distant motors controlled by the first, the armatures of which are connected to independent sources of current of one direction, the field-coils being included in other independent circuits supplying currents of alternating direction through the armature of a vibrator, said field-coils being connected one terminal to the armature of said vibrator and the other to the middle point of a split battery the opposite poles of which are connected to the two stop-contacts of said vibrator, the coils of which are included in the main-line circuit.

7. Means for producing the uniform motion of a number of electric motors placed at distant points and consisting of a series of vibrators connected at said points in a main-line circuit, said circuit being connected to a source of alternating currents through the armature of a single independent vibrator the coils of which are included between the terminals of a revolving-armature circuit of a governing direct-current electric motor, the vibrators in the main-line circuit being connected to the field-coils of the other electric motors, one terminal to the middle point of a split battery and the other to the armature of the local vibrator the two stop-contacts of which are connected to the opposite poles of said battery, all the armature-coils of the distant governed motors being connected in separate independent direct-current circuits.

8. A synchronizing system for electric motors comprising a line-circuit, a current-controller for periodically changing the current in said line-circuit, a series of electric motors controlled by the currents in said line-circuit, the field-magnet currents in said electric motors being periodically reversed in accordance with the changes of current in said line-circuit, the armature-circuits of said motors connected to a source of direct current.

In testimony that I claim the foregoing as my invention I have hereunto set my hand, this 31st day of May, 1888, in the presence of two witnesses.

F. JARVIS PATTEN.

Witnesses:
HERBERT C. PELL,
A. J. RICE.